US008780402B2

(12) United States Patent
Ramani et al.

(10) Patent No.: US 8,780,402 B2
(45) Date of Patent: Jul. 15, 2014

(54) DOCUMENT AND METHOD OF PRODUCING A DOCUMENT

(75) Inventors: Srinivasan Ramani, Karnataka (IN); Anil Kumar, Karnataka (IN); Darpan Goel, Karnataka (IN); Srinivasu Godavari, Karnataka (IN); Anjaneyulu Seetha Rama Kuchibhotla, Karnataka (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 1186 days.

(21) Appl. No.: 12/043,138

(22) Filed: Mar. 6, 2008

(65) Prior Publication Data

US 2009/0059309 A1    Mar. 5, 2009

(30) Foreign Application Priority Data

Sep. 4, 2007    (IN) .............................. 746/CHE/2007

(51) Int. Cl.
*G06K 15/00*    (2006.01)
(52) U.S. Cl.
USPC ....................................................... 358/1.18
(58) Field of Classification Search
USPC .................. 358/1.1, 1.13, 1.15, 1.18, 400
See application file for complete search history.

(56) References Cited

U.S. PATENT DOCUMENTS

| | | | | |
|---|---|---|---|---|
| 5,862,270 A * | 1/1999 | Lopresti et al. | ............... | 382/306 |
| 5,912,974 A | 6/1999 | Holloway et al. | | |
| 6,208,436 B1 * | 3/2001 | Cunningham | ................ | 358/474 |
| 6,567,530 B1 * | 5/2003 | Keronen et al. | ............... | 382/100 |
| 2005/0278626 A1 * | 12/2005 | Malik | ........................... | 715/530 |
| 2006/0117182 A1 | 6/2006 | Wolff | | |
| 2007/0024657 A1 * | 2/2007 | Zhang et al. | .................... | 347/19 |

* cited by examiner

*Primary Examiner* — Jeremiah Bryar

(57) ABSTRACT

A physical document comprising a human-readable part and a machine-readable part, wherein the machine-readable part comprises markup that describes information on at least one of the document and data within the human-readable part.

22 Claims, 5 Drawing Sheets

DOCUMENT AND METHOD OF PRODUCING A DOCUMENT

RELATED APPLICATIONS

Benefit is claimed under 35 U.S.C. 119(a)-(d) to Foreign application Ser. 746/CHE/2007 entitled "A DOCUMENT AND METHOD OF PRODUCING A DOCUMENT" by Hewlett-Packard Development Company, L.P., filed on 9 Apr. 2007, which is herein incorporated in its entirety by reference for all purposes.

BACKGROUND TO THE INVENTION

Transferring an electronic document to a paper document that is human-readable is relatively straightforward. However, the reverse process of transferring a paper document to an electronic document can be expensive and inefficient. For example, optical character recognition (OCR) can be inaccurate and cannot be applied to non-textual data.

Machine-readable markings, such as 2D barcodes, can be included on a paper document. However, machine-readable markings represent certain types of data, such as images, inefficiently because large amounts of data cause the machine-readable markings to occupy a significant portion of the paper document.

It is an object of embodiments of the invention to at least mitigate one or more of the problems of the prior art.

BRIEF DESCRIPTION OF THE DRAWINGS

Embodiments of the invention will now be described by way of example only, with reference to the accompanying drawings, in which.

DETAILED DESCRIPTION OF EMBODIMENTS OF THE INVENTION

Embodiments of the invention are related to the need to transfer an electronic record to a physical document, or a physical document to an electronic record, while maintaining content equivalence between the electronic record and the physical document. A physical document may be, for example, a paper document. An electronic record may be, for example, an electronic document such as an email or word processor document. Content equivalence between two documents, or between a document or a record, means that the content of a document is the same, although the documents may comprise minor differences. For example, if a physical document is transferred to an electronic record and then back to a physical document, the content between the two physical documents may be the same, even if there are differences in, for example, the layout, fonts used and/or other differences that are not related to the content of the document.

For example, a form may be filled in by a person at a PC or kiosk to form an electronic record, and printed to produce a physical document that is content-equivalent to the electronic record. The machine-readable part may include some or all of the information entered by the person and shown in the human-readable part of the physical document, and may additionally or alternatively include other information not shown in the human-readable part, such as, for example, a digital signature to prevent tampering of the form, and/or any other information. The form may be processed, for example, by a processing centre that handles such forms by providing the physical document to a data processing system that reads the machine-readable part and may also read at least some of the human-readable part. Thus an electronic record is created that is content-equivalent to the original electronic record produced at the PC or kiosk.

An electronic record may have a human-readable part and a machine-readable part. For example, an email may have a human-readable part, such as the message body, and a machine-readable part, such as the header information or a digital signature. The human-readable part is intended to be read by a human, even if the human-readable part can be read and interpreted by a machine using, for example, OCR and/or artificial intelligence. Similarly, the machine readable part is readable and is intended to be used by a machine, such as a data processing system, even if the machine-readable part may also be read and interpreted by a human.

Figure 1:
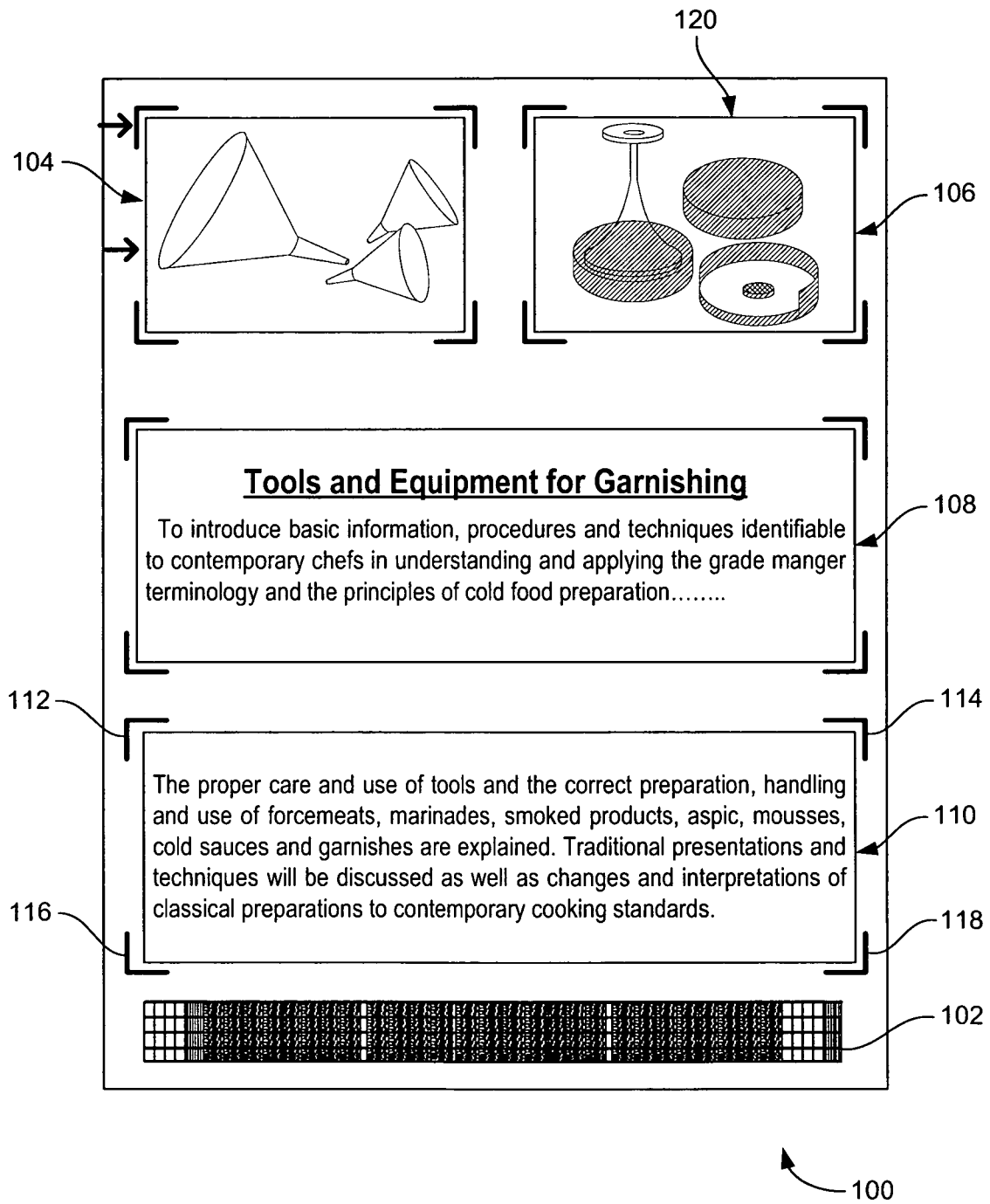
FIG. 1 shows an example of a document according to embodiments of the invention.

FIG. 1 shows a physical document 100 according to embodiments of the invention. The physical document comprises a human-readable part and a machine-readable part 102. The human-readable part comprises four rectangular segments 104, 106, 108 and 110. The data of the document 100, i.e. its content, can be found in the human-readable part. In embodiments of the invention, a segment contains data of a single type, such as text or an image. However, in other embodiments of the invention, a segment may comprise data of any number of types. In other embodiments of the invention, there may be any number of segments on a physical document 100, each having any shape. There may also be any number of pages, although the document 100 in FIG. 1 comprises a single page.

The segments 104 and 106 each contain an image. The segments 108 and 110 contain text. Each segment is marked by fiducial marks at the segment's corners. For example, the segment 110 has fiducial marks 112, 114, 116 and 118 at its corners. The fiducial marks may be, for example, machine-readable markings that can be used by a machine, for example a data processing system, for locating the segments in a physical document.

The machine-readable part 102 comprises a black and white 2D barcode, although in other embodiments any type of machine-readable representation of data may be used. The machine-readable part comprises markup. That is, the machine-readable part is made up of data in a markup language. For example, the markup language may be XHTML, and the machine-readable part may comprise an XHTML document that is encoded into the 2D barcode. In alternative embodiments of the invention, other markup languages may be used such as, for example, XML.

The markup can be used to describe information about the physical document and/or certain aspects of its content. For example, where the physical document is content-equivalent to an email, the markup may contain the header information of the email. In this way, the machine-readable part of the email is included within the content-equivalent physical document in a way that can be reliably recovered when the physical document is transferred to a content-equivalent electronic record.

The markup may also be used, for example, to specify information about some or all of the content of the physical document. For example, where a document includes one or more segments containing images, the markup may specify information about the images, such as Exif (exchangeable image file format) information. Such information is not typically included in an image on a physical document. Where a document includes one or more segments containing text, the markup may specify information about the text, such as font, font size and justification. Such information may be difficult to obtain from the text itself using, for example, OCR.

The markup may also be used, for example, to encode some of the data in the human-readable part so that it can be recovered reliably. For example, some or all of the text in a segment containing text can be encoded into the markup in the machine-readable part so that it can be reliably recovered when transferring the physical document into a content-equivalent electronic record. Additionally or alternatively, redundant information such as a checksum may be included in the markup so that any recovery of data from the human-readable part and/or the machine-readable part can be verified. When transferring the physical document to a content-equivalent electronic record, any data not obtained from the machine-readable part may be obtained from the human-readable part, for example by OCR or scanning of images. For example, a physical document that contains text and images may have the text included within the machine-readable part. When transferring the physical document to a content-equivalent electronic document, the text data may be obtained reliably from the machine-readable part, whereas the images may be obtained by scanning the human-readable part.

Where information within the markup refers to data within a segment, the markup may refer directly to the appropriate segment. For example, within the physical document 100 shown in FIG. 1, the markup may describe Exif information relating to the image 120 in the segment 106, with or without specifying information relating to the other segments in the document. The use of markup provides, for example, a flexible tool to include different information in the markup depending on the circumstances. For example, where a document contains many images, the Exif information can be included for one or more of the images. Where it is essential for a document to be reproduced correctly, suitable information such as one or more checksums or the data in the human-readable part can be included in the markup. Where document security is important, a digital signature can be included in the markup. Then, if the content is manipulated, the digital signature will no longer be valid and the manipulation of the content will be detected.

The markup may also be used, for example, to include information relating to the layout of the document. For example, the markup may specify the type of fiducial marks on the document, the number, location and/or size of the segments in the human-readable part, and/or the type of data contained within each segment. This may, for example, ensure that the layout of the physical document is preserved when transferred to a content-equivalent electronic record, and/or may improve the accuracy of recognising the fiducial marks in the human readable part or make the marks unnecessary.

The markup may be used to describe any types of data. For example, the markup may be used to describe text, image data, rules and/or any other type of data.

The markup may be used to specify one or more of the types of information specified above, and/or any other information. The markup may include rules that specify how information in the markup should be combined with data in the human-readable part of the physical document to create a content-equivalent electronic document.

The machine-readable part of a physical document may be located anywhere in the physical document. For example, the machine-readable part may be located on one page, such as the first page or on a separate page, or spread across multiple pages. The machine readable part may be located anywhere on a page or in multiple locations on a page.

An electronic record may be transferred to a physical document by, for example, printing the document on paper. Information that is not to be printed, such as, for example, image Exif information, an email header, and any other information about the document, such as author, creation date and other information may be included in the markup which forms the machine-readable part of the physical document. The markup provides information and specifies what the information relates to, such as the whole document or a particular segment.

A physical document may be transferred to an electronic record by, for example, scanning the document to obtain an electronic representation (such as images) of the physical document, and then converting the images to an electronic record. For example, image processing techniques may be used to locate the machine-readable part on the images of the physical document and extract the markup from the machine-readable part. Image processing techniques and/or the markup in the machine-readable part may be used to locate the data in the human-readable part and/or extract the data from the physical document.

The machine-readable part of a physical document may include error correction information. Therefore, the machine-readable part may be read accurately even in the event of degradation of the machine-readable part, such as, for example, degradation of the physical document and/or poor scanning of the physical document.

The machine-readable part may comprise a 2D barcode according to the PDF417 (ISO/IEC 15438) specification, although any other format for the machine-readable part may be used in alternative embodiments.

Figure 2:
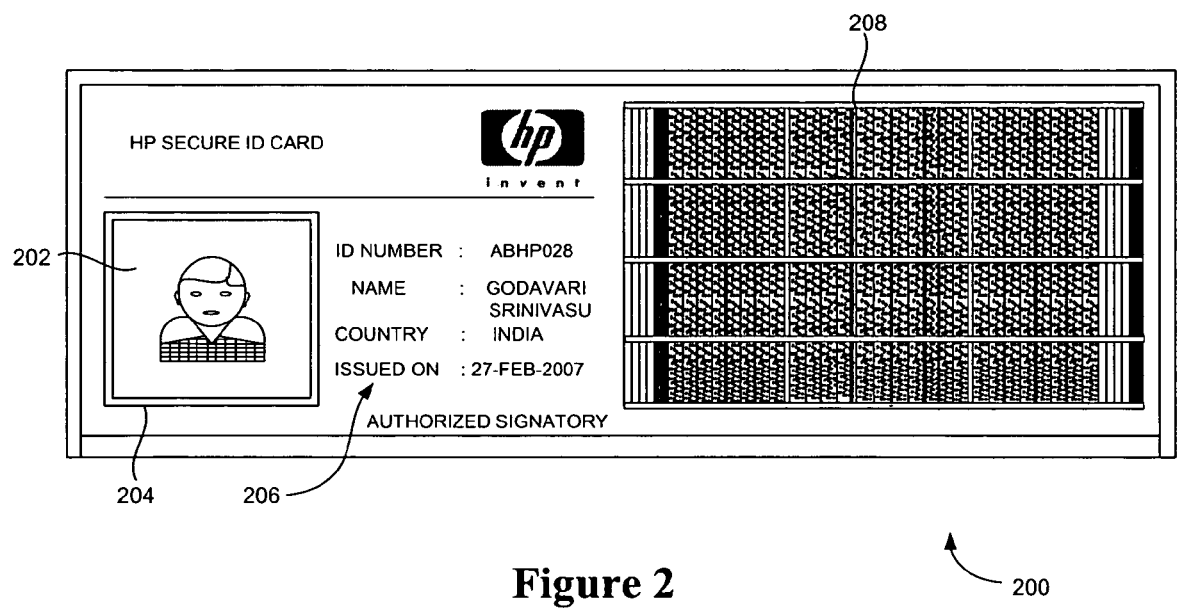
FIG. 2 shows an example of another document according to embodiments of the invention.

FIG. 2 shows another example of a physical document 200 according to embodiments of the invention. The physical document 200, which is an example of an ID card, includes an image 202 of the person associated with the ID card. The image is surrounded by fiducial marks 204, which comprise a double border around the image 202 in the document 200. The document 200 also includes a human readable text part 206 and a machine-readable part 208.

The machine-readable part 208 comprises, for example, XHTML data that describes some information relating to the physical document 200. An example of XHTML data encoded within the machine-readable part 208 is given below:

```
<?xml version="1.0" encoding="UTF-8"?>
<!DOCTYPE html PUBLIC "-//W3C//DTD XHTML-Print 1.0//EN"
        "http://www.w3.org/MarkUp/DTD/xhtml-print10.dtd">
<html xmlns="http://www.w3.org/1999/xhtml">
<head>
<title>xhtml_conform-BF-10</title>
<style type="text/css">
  .ital { font-style: italic }
</style>
</head>
<body>
<table>
    <tr>
        <td align="center"><b>HP Secure ID Card</b></td>
    </tr>
```

-continued

```
    <tr>
        <td rowspan="3" align="center" ><img src="###1"
                        alt="Srinivasu"/></td>
        <td> </td>
    </tr>
    <tr>
        <td> </td>
        <td>ID Number :</td>
        <td>ABHP028</td>
    </tr>
    <tr>
        <td> </td>
        <td>Name :</td>
        <td>Godavari Srinivasu</td>
    </tr>
    <tr>
        <td> </td>
        <td>Country :</td>
        <td>India</td>
    </tr>
    <tr>
        <td> </td>
        <td>Issued on :</td>
        <td>27-Feb-2007</td>
    </tr>
</table>
</body>
</html>
```

In the above XHTML data, a table (which comprises the XHTML tags <table> and </table> and the data between them) describes the image 202 and the human readable text part 206. The second row (where a row comprises the XHTML tags <tr> and </tr> and the data between them) indicates an image with a source "###1" and an "alt" data of "Srinivasu". The source indicates which segment the first row refers to. In the case of the ID card 200, "###1" refers to the image 202. There is only one image in the ID card 200, although any method of referring to images in documents may be used. For example, a method of referring to images may be used where the first image, "###1", is the first image encountered from left to right and top to bottom in a document, the second image, "###2", is the second image encountered from left to right and top to bottom and so on. The source may alternatively indicate, for example, the approximate position and/or size of the image in the document. The "alt" data provides information on the image that cannot or may not be obtainable from the image itself. In this case, "Srinivasu", which is the surname of the person to which the ID card relates, is associated with the image 202. Therefore, when the document 200 is transferred to an electronic record, the "alt" data of "Srinivasu" can be associated with the electronic representation of the image 202.

The next four rows of the XHTML data following the row containing the image contain the text within the human-readable text part 206 of the document 200.

Figure 3:
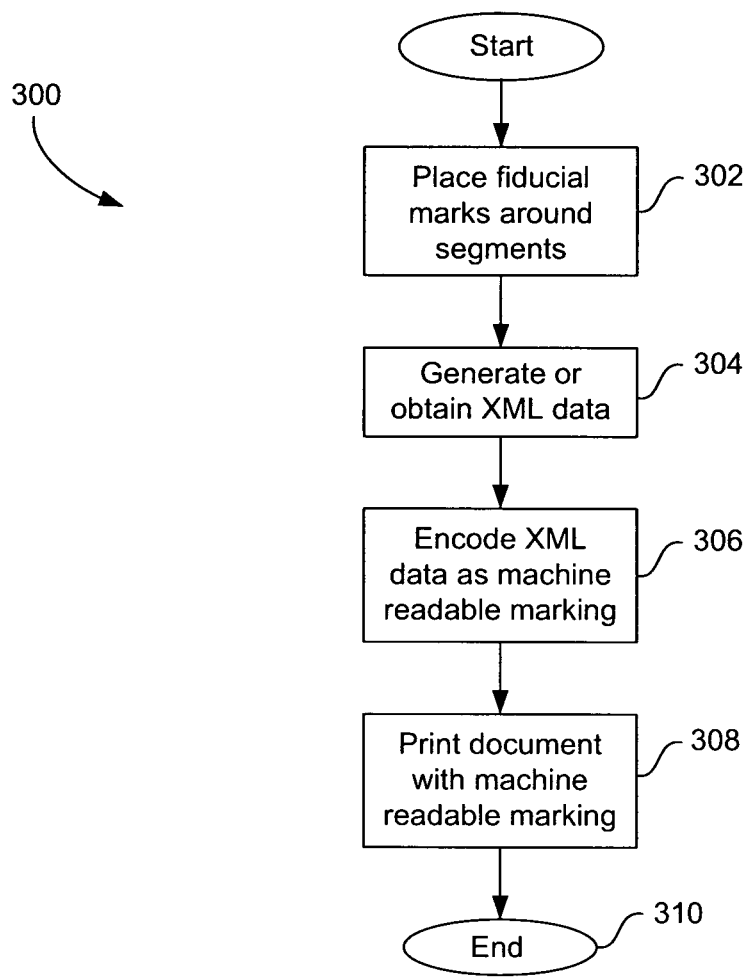
FIG. 3 shows an example of a method to create a physical document according to embodiments of the invention.

FIG. 3 shows an example of a method 300 of transferring an electronic record to a physical document according to embodiments of the invention. The method 300 starts at step 302 where fiducial marks are placed around segments in the document. For example, the electronic record may be prepared as an image or a representation ready for printing, and fiducial marks may be placed around segments within the image or representation.

From step 302, the method 300 proceeds to step 304 where XHTML data for including within the machine-readable part of the electronic record is generated or obtained. For example, the XHTML data may be human-generated, or generated by a software component that knows what information should be included within the machine-readable part, such as information associated with images. The method 300 then continues from step 306, where the XHTML data is encoded into a machine-readable marking using an encoding method such as, for example, the PDF417 (ISO/IEC 15438) specification as indicated above. In step 308, which follows from step 306, the physical document is printed such that it includes the machine-readable marking. For example, the machine-readable marking is added to the image or representation for printing. Following step 308, the method 300 ends at step 310.

Figure 4:
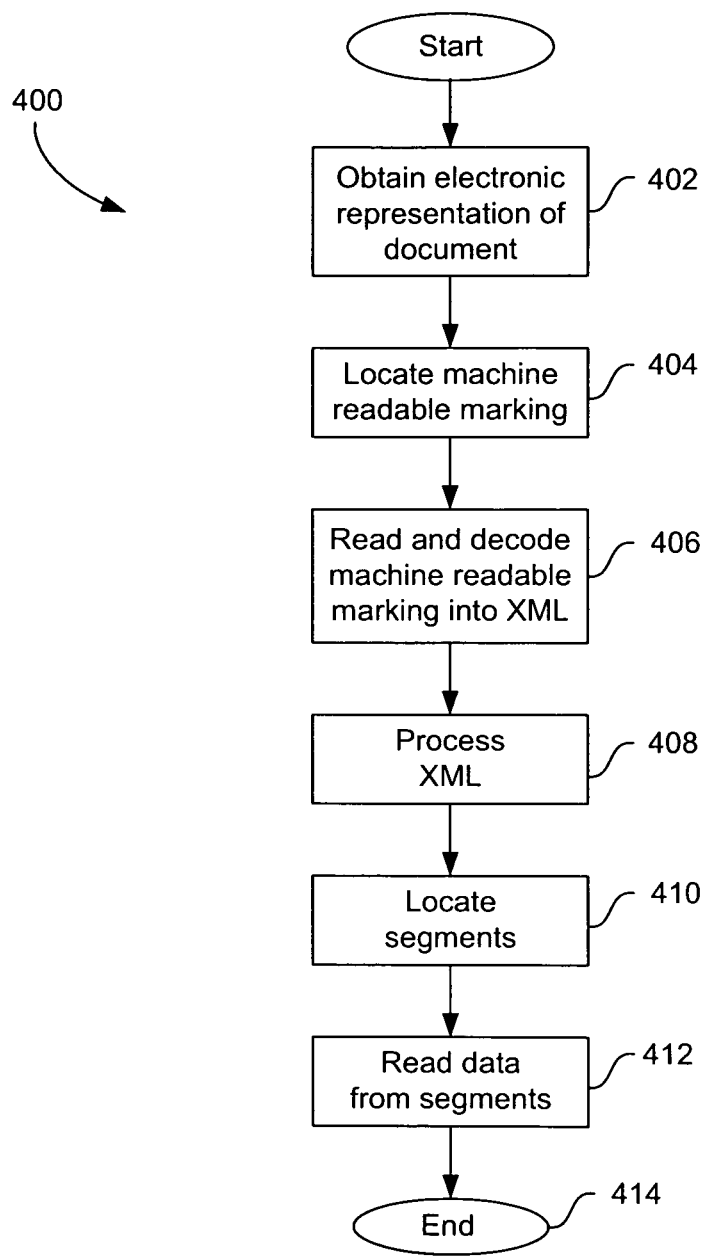
FIG. 4 shows an example of a method to transfer a physical document to an electronic record according to embodiments of the invention.

FIG. 4 shows an example of a method 400 for transferring a physical document to an electronic record according to embodiments of the invention. The method 400, which may be carried out by, for example, a data processing system, starts at step 402 where an electronic representation of the physical document is obtained. The electronic representation may comprise, for example, an image or images of the document, and these may be obtained, for example, by scanning the document using a scanner or all-in-one (AiO) device. Alternatively, the electronic representation may be obtained using other means, for example by email where the physical document was scanned elsewhere. From step 402, the method 400 continues from step 404 where the machine-readable marking on the electronic representation is located. The marking, for example a barcode, may be in a predetermined position, or may be found by locating, for example, fiducial marks associated with the marking and indicating where the marking is located, or locating it by any other suitable means.

In step 406, which follows from step 404, the machine-readable marking is read and decoded to extract the XHTML data encoded therein. Then, in step 408, the XHTML data is processed to obtain information on the physical document. For example, information on segments present in the physical document is obtained, and/or it is determined from the XHTML data whether there are any images for which additional information is specified in the XHTML data. Next, in step 410, segments (for example, segments that are referred to in the XHTML data, and/or segments that are indicated by fiducial marks) are located in the electronic representation. In step 412, which follows from step 410, data is read (for example, an image is scanned and/or image data is converted to text using OCR) from the segments, and combined with the XHTML data to form the electronic record. The method 400 then ends at step 412.

For example, in the case of the ID card 200 shown in FIG. 2, the XHTML data extracted from the machine-readable marking 208 would refer to the image 202 (referred to as the image "###1"). Therefore, the fiducial markings 204 would be located (for example, using image processing) and the image 204 extracted as image data. The XHTML data and the image data would then together comprise the electronic document. The text in the text area 206 is also found in the XHTML data, and it is therefore not necessary to extract data from the text area 206, although this may be done in certain embodiments for security/verification purposes. The electronic record may be printed to form a physical document using, for example, the method 300 shown in FIG. 3, and may in certain embodiments also be combined with a template such that the appearance of the physical document conforms to the template.

Figure 5:
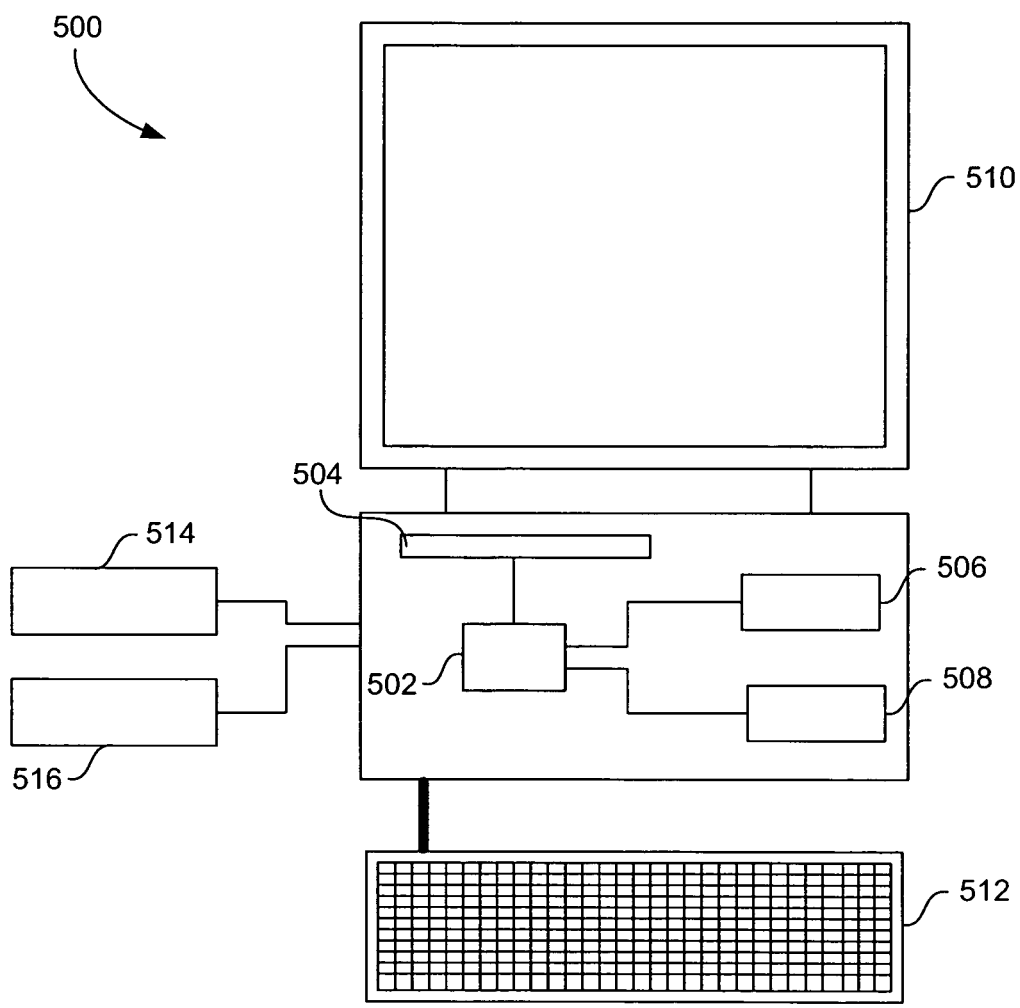
FIG. 5 shows an example of a data processing system suitable for implementing embodiments of the invention.

FIG. 5 shows an example of a data processing system 500 suitable for implementing embodiments of the invention. The system 500 includes a data processor 502 and a main memory 504. The system 500 may also include a permanent storage device 506, such as a hard disk, and/or a communications device 508 for communicating with an external wired and/or wireless network (not shown) such as a LAN, WAN, internet and/or other network. The system 500 may also include a display device 510 and/or an input device 512 such as a keyboard and/or mouse.

The system 500 may also include a printer 514. The printer 514 may be used, for example, to print physical documents that are content-equivalent to electronic records. The system 500 may also include a scanner 516 that may be used, for example, to provide an electronic representation of a physical document to the system 500 so that a content-equivalent electronic document may be created.

In alternative embodiments, a data processing system may comprise or include an all-in-one (AiO) device or multifunction printer (MFP). Such devices include both printing and scanning capabilities and may be used to transfer both electronic documents to physical documents and physical documents to electronic documents.

It will be appreciated that embodiments of the present invention can be realised in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are embodiments of machine-readable storage that are suitable for storing a program or programs that, when executed, implement embodiments of the present invention. Accordingly, embodiments provide a program comprising code for implementing a system or method as claimed in any preceding claim and a storage device storing such a program. Still further, embodiments of the present invention may be conveyed electronically via any medium such as a communication signal carried over a wired or wireless connection and embodiments suitably encompass the same.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed. The claims should not be construed to cover merely the foregoing embodiments, but also any embodiments which fall within the scope of the claims.

The invention claimed is:

1. A physical document for processing by a data processing system including a processor, comprising:
    a substrate, wherein the substrate has disposed thereon:
        a human-readable part, wherein the human-readable part comprises at least one segment, and fiducial marks indicating a location of the at least one segment on the substrate; and
        a machine-readable part, wherein the machine-readable part comprises a markup that describes information on the at least one segment and data within the at least one segment of the human-readable part, and wherein the markup includes information for determining a location of the at least one segment on the substrate, and information specifying a type of the fiducial marks indicating the location of the at least one segment on the substrate.

2. The document as claimed in claim 1, wherein the machine-readable part comprises at least part of the data within the at least one segment of the human-readable part.

3. The document as claimed in claim 1, wherein the human-readable part contains at least one image, and the machine-readable part comprises markup that describes information on the at least one image.

4. The document as claimed in claim 1, wherein the markup further comprises at least one of a number, a location and/or size of the at least one segment, and a type of data within the at least one segment, and rules to determine how the information described in the markup is to be combined with the data within the at least one segment of the human-readable part.

5. The document as claimed in claim 1, wherein the markup comprises at least one of one or more checksums and the data in the human-readable part when the physical document needs to be produced correctly, and wherein the markup comprises a digital signature when the physical document needs security.

6. The document as claimed in claim 1, wherein the human-readable part contains text, and the machine-readable part comprises markup that describes information of the text, wherein the information of the text includes at least one of font, font size, and justification.

7. A processor-implemented method of producing a physical document from an electronic record, comprising:
    producing, by a processor, a human-readable part that includes human-readable data from the electronic record, wherein at least one segment is included in the human-readable part;
    placing fiducial marks on the human-readable part to indicate a location of the at least one segment on the physical document; and
    producing, by the processor, a machine-readable part that includes a markup language that describes information on the at least one segment, the electronic record, data in the at least one segment of the human-readable part of the physical document, and the human-readable data in the electronic record, wherein the markup language specifies information for locating the at least one segment on the physical document, including a type of the fiducial marks indicating the location of the at least one segment on the physical document.

8. The method as claimed in claim 7, wherein the machine-readable part comprises at least part of the data within the at least one segment of the human-readable part.

9. The method as claimed in claim 7, wherein producing the human-readable part comprises dividing the human-readable part into a plurality of segments, each segment of the plurality of segments having fiducial marks associated therewith, and wherein the markup language comprises references to the plurality of segments and information on the plurality of segments and data within the plurality of segments, including the type of the fiducial marks associated with the plurality of segments.

10. The method as claimed in claim 7, wherein the electronic record is an electronic document.

11. A non-transitory computer readable storage medium storing a computer program comprising code, that when executed by a computer, result in execution of the method as claimed in claim 7.

12. The method as claimed in claim 7, wherein producing a markup language includes producing a markup language that includes at least one of a number, a location and/or size of the at least one segment in the physical document, a type of data within the at least one segment, and rules for how the information described in the markup language is to be combined with the data within the physical document.

13. A processor-implemented method of producing an electronic record from a physical document, comprising:
   obtaining an electronic representation of the physical document by a processor, wherein the physical document includes at least one segment and fiducial marks to indicate a location of the at least one segment on the physical document; and
   reading, by the processor, a machine-readable part of the electronic representation of the physical document to obtain a markup language describing information on the at least one segment of the physical document, wherein the markup language includes information for determining a location of the at least one segment in the physical document, and information specifying a type of the fiducial marks indicating the location of the at least one segment on the physical document.

14. The method as claimed in claim 13, comprising obtaining the data from at least one of a human-readable part of the electronic representation and the machine-readable part of the electronic representation.

15. The method as claimed in claim 13, comprising scanning the physical document to obtain the electronic representation.

16. The method as claimed in claim 13, wherein the electronic record is an electronic document.

17. A non-transitory computer readable storage medium storing a computer program having code, that when executed by a computer, result in execution of the method as claimed in claim 13.

18. The method of claim 13, wherein the reading of the markup language by the processor further includes reading at least one of a number, a location and/or size of the at least one segment in the physical document, a type of data within the at least one segment, and rules for how the information described in the markup language is to be combined with the data within the physical document.

19. A data processing system for producing a physical document from an electronic record, comprising:
   memory, and
   a processor coupled to the memory, wherein the processor is configured to:
      produce a human-readable part that includes human-readable data from the electronic record, wherein at least one segment is included in the human-readable part and the at least one segment includes at least one fiducial mark to indicate a location of the segment on the physical document; and
      produce a machine-readable part that includes a markup language that describes information on the at least one segment, the electronic record, data in the at least one segment of the human-readable part of the physical document, and the human-readable data in the electronic record, wherein the markup language includes information to determine a location of the at least one segment on the physical document, and information specifying a type of the at least one fiducial mark indicating the location of the at least one segment on the physical document.

20. The data processing system as claimed in claim 19, wherein the markup language further includes at least one of a number, a location and/or size of the at least one segment in the physical document, a type of data within the at least one segment, and rules for how the information described in the markup language is to be combined with the data within the physical document.

21. A data processing system for producing an electronic record from a physical document, comprising:
   memory, and
   a processor coupled to the memory, wherein the processor is configured to:
      obtain an electronic representation of a physical document having at least one segment and fiducial marks to indicate a location of the at least one segment on the physical document; and
      read a machine-readable part of the electronic representation of the physical document to obtain a markup language describing information on at least one of the physical document and data within the physical document, wherein the markup language includes information for determining a location of the at least one segment on the physical document, and information specifying a type of the fiducial marks indicating the location of the at least one segment on the physical document.

22. The data processing system as claimed in claim 21, wherein the markup language further includes at least one of a type of fiducial mark on the physical document for locating the at least one segment, at least one of a number, a location and/or size of the at least one segment in the physical document, a type of data within the at least one segment, and rules for how the information described in the markup language is to be combined with the data within the physical document.

* * * * *